United States Patent
Schirle et al.

(10) Patent No.: US 9,758,306 B2
(45) Date of Patent: Sep. 12, 2017

(54) CONTINUOUS CONVEYOR

(71) Applicant: BLEICHERT Automation GmbH & Co. KG, Osterburken (DE)

(72) Inventors: Anton Schirle, Stimpfach (DE); Wolfgang Graaf, Osterburken (DE)

(73) Assignee: BLEICHERT AUTOMATION GMBH & CO. KG, Osterburken (DE)

( * ) Notice: Subject to any disclaimer, the term of this patent is extended or adjusted under 35 U.S.C. 154(b) by 0 days.

(21) Appl. No.: 15/311,773

(22) PCT Filed: May 15, 2015

(86) PCT No.: PCT/EP2015/060782
§ 371 (c)(1),
(2) Date: Nov. 16, 2016

(87) PCT Pub. No.: WO2015/173406
PCT Pub. Date: Nov. 19, 2015

(65) Prior Publication Data
US 2017/0081126 A1  Mar. 23, 2017

(30) Foreign Application Priority Data
May 16, 2014  (DE) .......... 10 2014 106 956

(51) Int. Cl.
*B65G 17/12* (2006.01)
*B65G 21/20* (2006.01)
(Continued)

(52) U.S. Cl.
CPC .......... *B65G 17/34* (2013.01); *B65G 17/002* (2013.01); *B65G 17/067* (2013.01); *B65G 17/48* (2013.01); *B65G 19/02* (2013.01)

(58) Field of Classification Search
CPC ......... B65G 17/00; B65G 17/12; B65G 21/20
(Continued)

(56) References Cited

U.S. PATENT DOCUMENTS 4,431,102 A * 2/1984 Bittner .................. B65G 19/02
198/345.3
4,757,893 A * 7/1988 Shabram, Jr. ........ B65G 37/005
104/172.3
(Continued)

FOREIGN PATENT DOCUMENTS

DE     2712214 A1    9/1978
DE     3918087 A1    2/1990
(Continued)

OTHER PUBLICATIONS

German Search Report, issued Jan. 27, 2015.
Translation of International Preliminary Report on Patentability, dated Dec. 1, 2016.

*Primary Examiner* — Douglas Hess
(74) *Attorney, Agent, or Firm* — Dority & Manning, P.A.

(57) ABSTRACT

A closed continuous conveyor for pallets has an upper run and a lower run, which respectively form an upper and a lower conveyor track with reversal sections in which deflecting elements are arranged, of which at least one is connected to and driven by an engine, with tension elements rotating endlessly in the upper and lower runs and in the reversal sections, which engage the deflecting elements in the reversal sections and are driven by them. At least one rotating pallet is carried by the tension elements. At least one closure element is fixed to the underside of the pallet and engages in the reversal section with a second form closure element or frictional closure element that rotates around a fixed axis of rotation. The closure element includes at least one elastic buffer component.

16 Claims, 6 Drawing Sheets

(51) Int. Cl.
*B65G 17/34* (2006.01)
*B65G 17/00* (2006.01)
*B65G 19/02* (2006.01)
*B65G 17/06* (2006.01)
*B65G 17/48* (2006.01)

(58) Field of Classification Search
USPC ....... 198/465.2, 465.3, 474.1, 803.2, 867.13, 198/867.14
See application file for complete search history.

(56) References Cited

U.S. PATENT DOCUMENTS

| | | | |
|---|---|---|---|
| 4,934,515 A | 6/1990 | Linden | |
| 5,407,058 A * | 4/1995 | Gyger | B65G 17/002 198/465.3 |
| 5,465,826 A * | 11/1995 | Noestheden | B65G 17/002 198/465.3 |
| 5,873,452 A * | 2/1999 | Nolan | B65G 17/002 198/465.3 |
| 6,868,959 B2 * | 3/2005 | Thomas | B65G 35/06 198/343.1 |
| 6,997,304 B2 * | 2/2006 | Thomas | B65G 35/06 198/465.3 |
| 7,007,795 B2 | 3/2006 | Zoller et al. | |
| 7,258,223 B2 * | 8/2007 | Strange | B65G 17/22 198/465.2 |
| 7,637,367 B1 * | 12/2009 | Cannell | B65G 17/002 198/465.3 |
| 9,315,326 B2 * | 4/2016 | Magni | B65G 35/06 |

FOREIGN PATENT DOCUMENTS

| | | |
|---|---|---|
| DE | 19716748 C1 | 12/1998 |
| DE | 10334171 A1 | 3/2005 |
| DE | 202005014860 U1 | 1/2006 |
| DE | 102009056545 A1 | 6/2011 |
| DE | 202011108531 U1 | 3/2012 |
| EP | 0256926 A1 | 2/1988 |
| EP | 0531610 A1 | 3/1993 |
| EP | 2189397 A1 | 5/2010 |
| FR | 2626858 | 2/1989 |
| FR | 2711933 A1 | 5/1995 |
| WO | WO2004000698 A1 | 12/2003 |

* cited by examiner

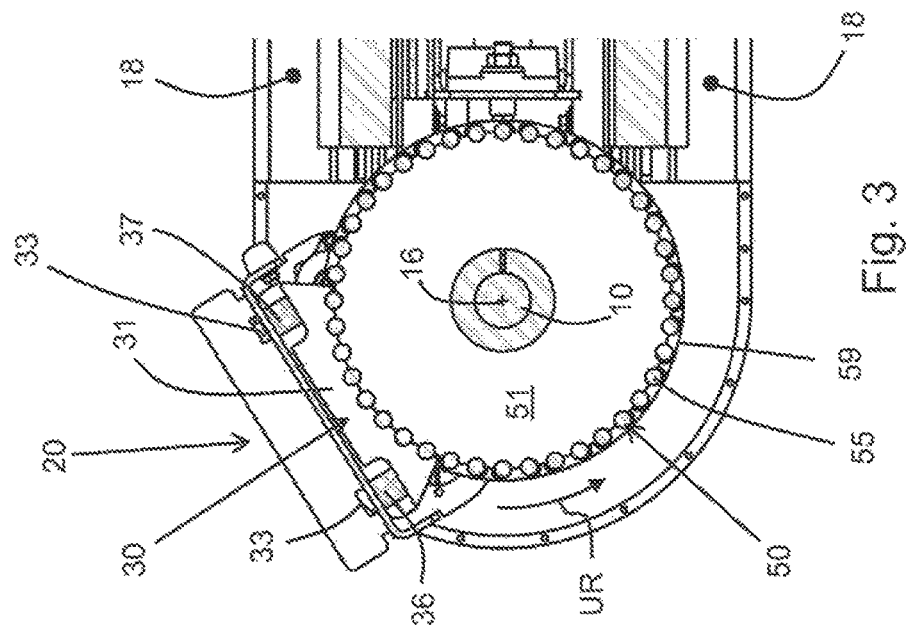
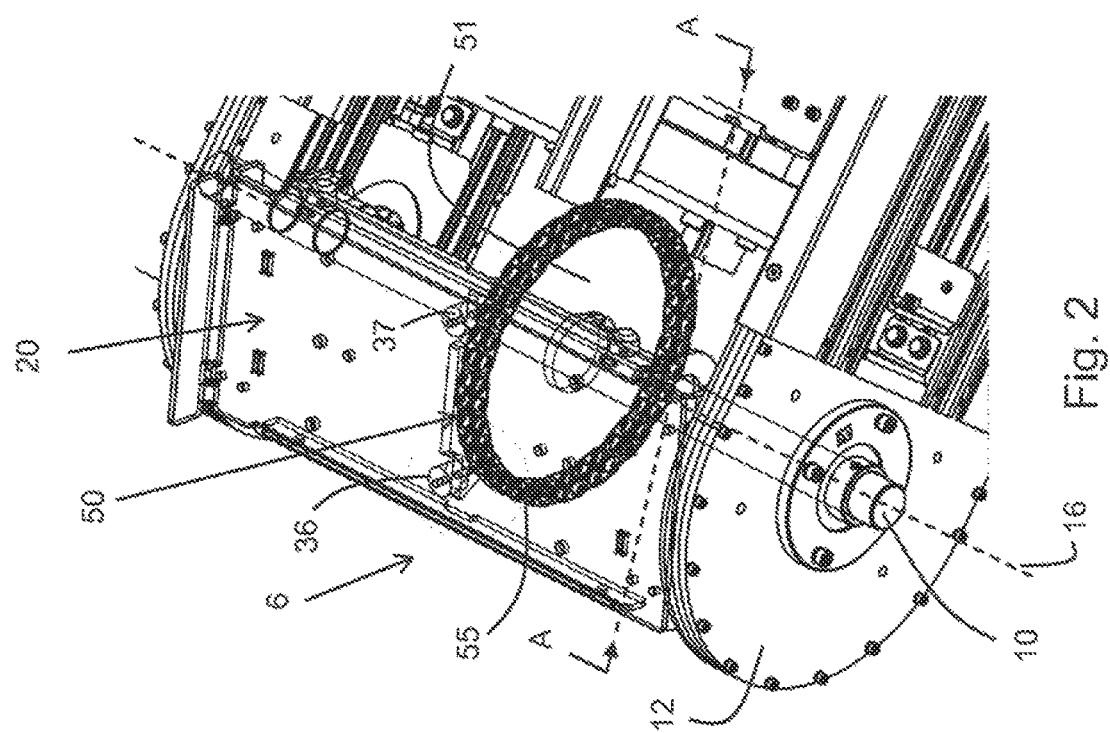

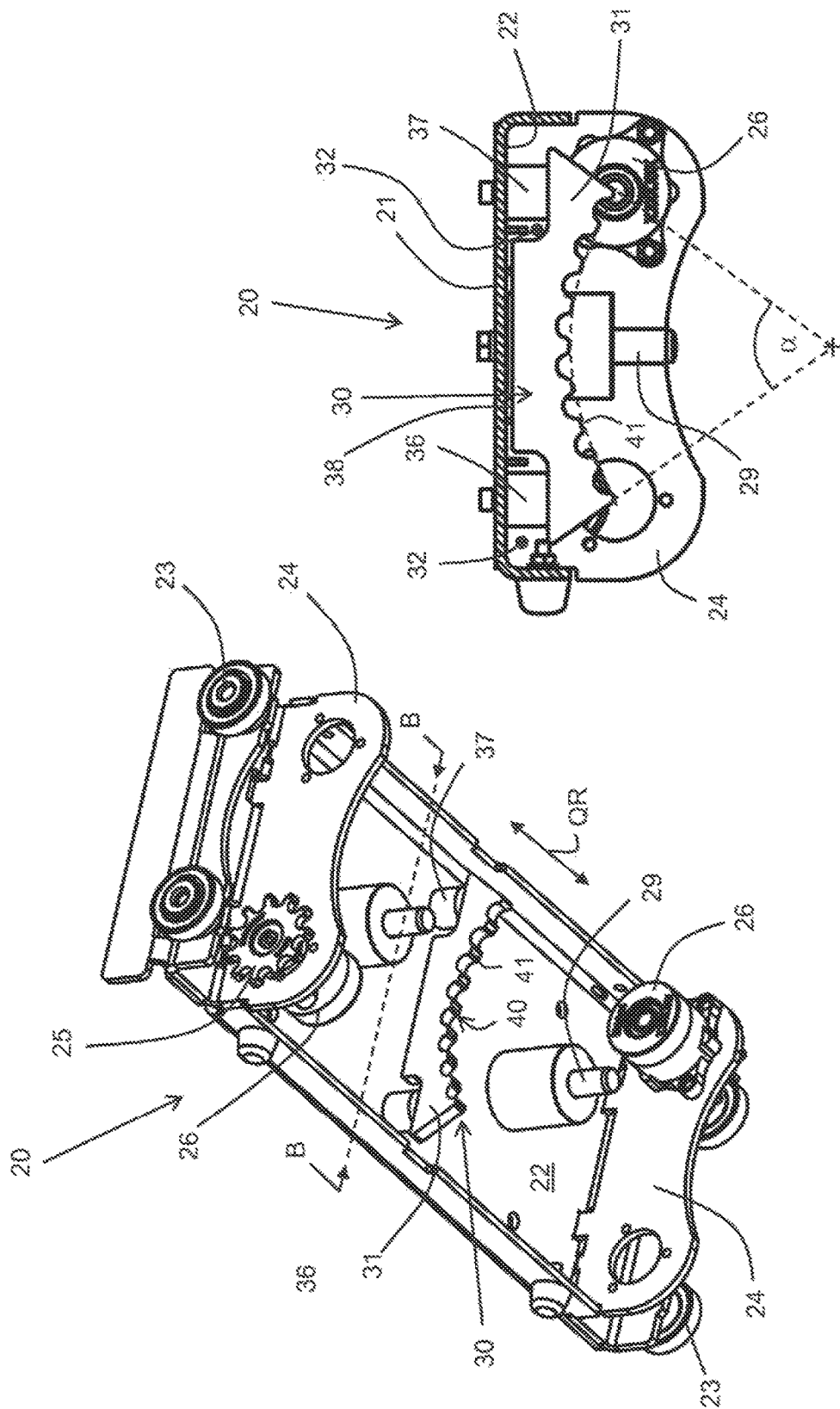

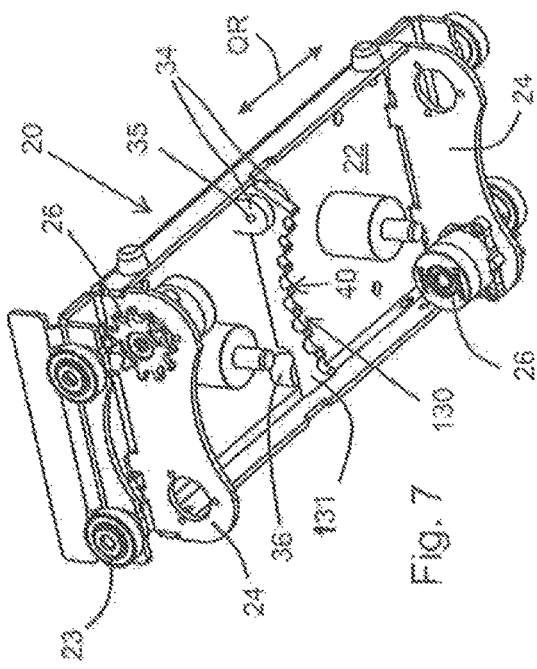
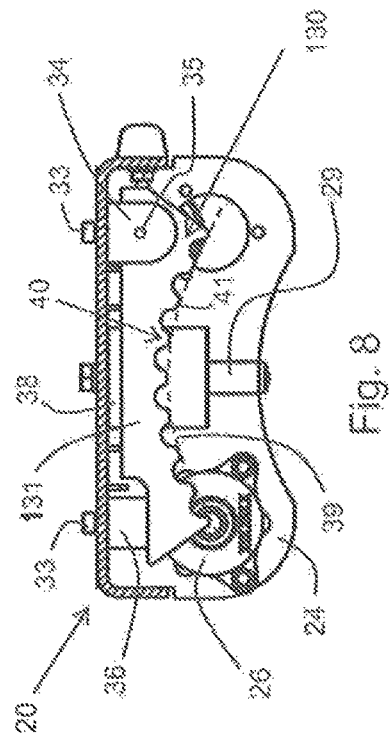
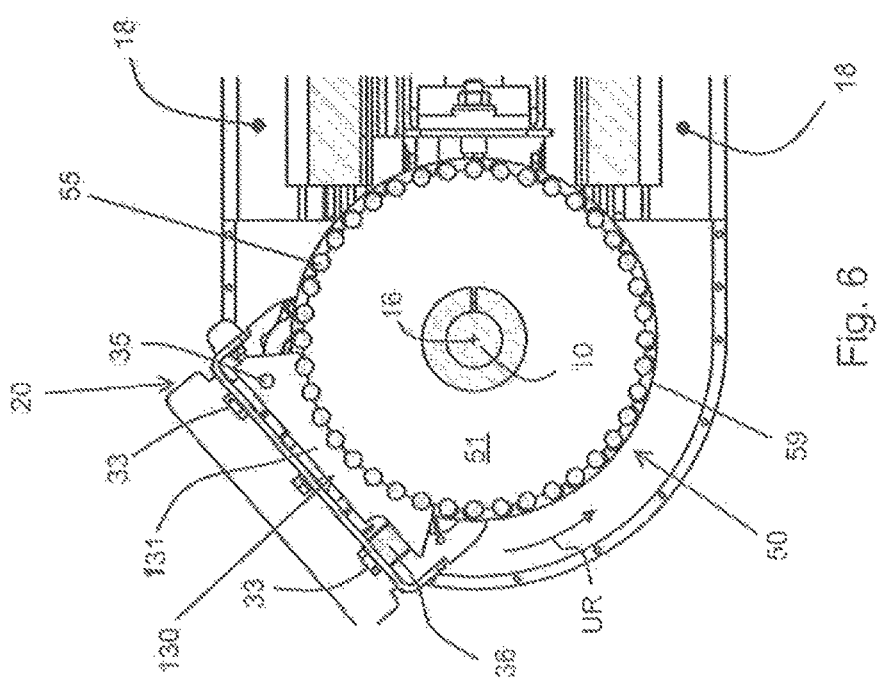

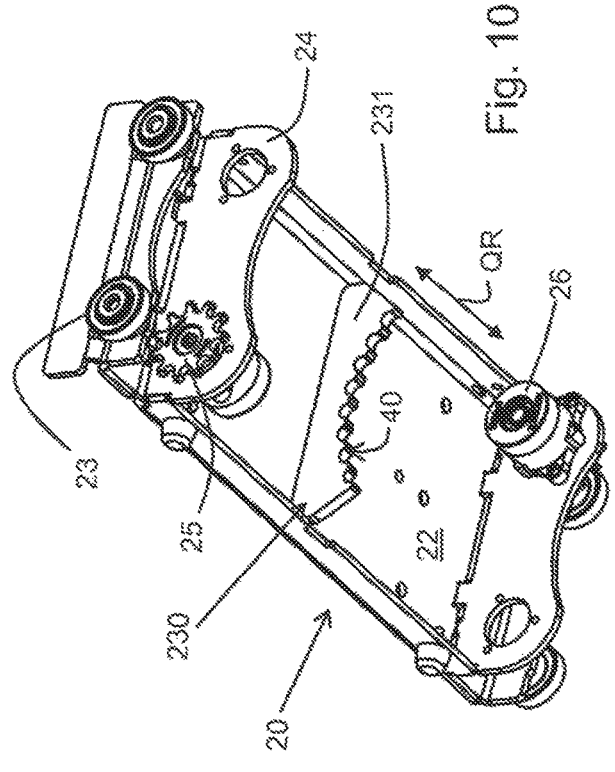
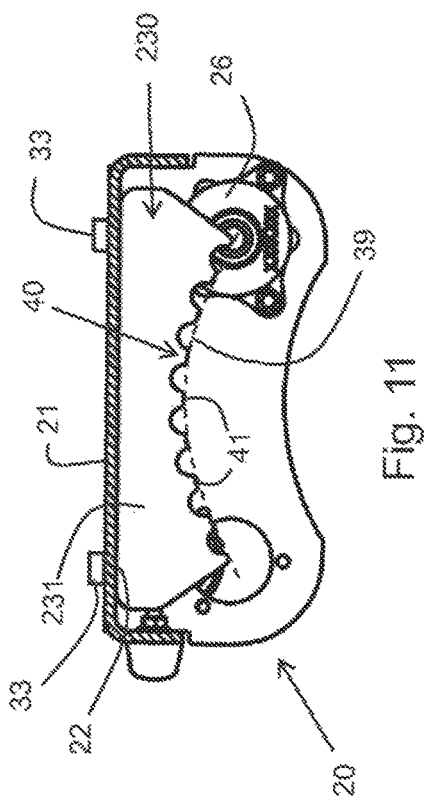
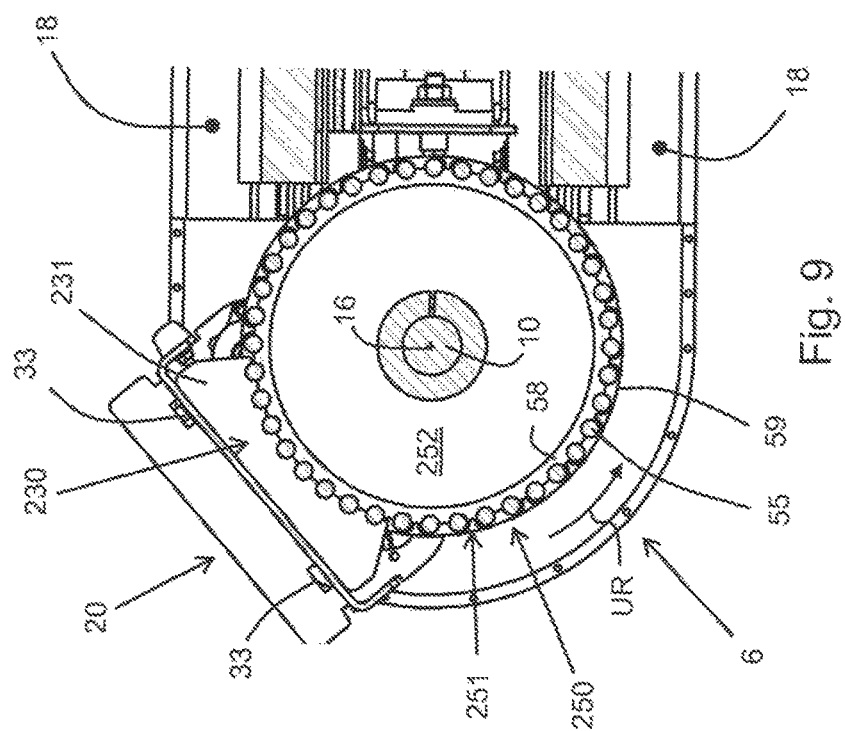

CONTINUOUS CONVEYOR

FIELD OF THE INVENTION

The invention relates to a continuous conveyor that moves pallets along an elongated upper run at the end of which the pallets reverse direction and then proceed back along an elongated lower run parallel to the upper run.

BACKGROUND OF THE INVENTION

Such continuous conveyors have long been known. In the upper run, workpieces placed on the rotating pallets—also known as workpiece carriers—are transported from one location to another. The workpieces comprise, for example, mounting parts for motor vehicle production that are transported to an assembly line by means of pallets. On the assembly line, the workpieces are removed, for example, by a robot, and are processed by production machines. Generally stated, such continuous conveyors are provided at various points and for the most diverse applications.

The tension elements are often designed as endless transport chains that rotate in the two side sections of the continuous conveyor. They are driven by motor-driven sprockets, which are arranged in the two reversal sections. With a known continuous conveyor, which is described in WO 2004/000698 A1, a gear wheel coupled with a hysteresis clutch or a viscose clutch is provided on each side of a pallet. The two gear wheels engage in the respective transport chain in the corresponding side section. The gear wheel does not rotate when the pallet is unimpeded; rather, it acts as a rigid pin that carries the pallet. Only when there is an obstacle to the continuation, in particular a waiting pallet, do the two gear wheels rotate in the continuously further driven transport chain, until the resistance by the preceding pallet no longer exists. So that the pallet can also be driven by means of the gear wheels in reversal sections, with this known device, each of the transport chains is formed with two rows or two tiers (or even three tiers), whereas such two rows are rigidly coupled with each other. Each of the transport chains is driven by a sprocket, whereas this sprocket engages only in one or, in the case of a three-tier formation, two strands of the chain, such that one chain strand remains free. The respective gear wheel of the pallet, which is connected to the hysteresis or viscose clutch, then runs in this chain strand, such that it is constantly in engagement with this series of transport chains.

The known pallet also features a running roller or a running wheel on its underside in all four corners, whereas such rollers run in or on rails along the two paths, which forcibly guide the running rollers and thus secure the pallet. Furthermore, a latch is fastened below each pallet, which is arranged opposite to one of the specified toothed rims. This latch forms a form closure with the chain in the reversal section, by which a secure travel of the pallet in the reversal section is ensured. However, with this structure, a simple lifting of the pallet by an operator is not possible.

Additional structures are known from the state of the art, which describe solutions for the deflection of pallets in the reversal sections from the upper run to the lower run. With known arrangements, a synchronization (for example) of engagement means arranged on the pallet and correspondingly formed carrying means on the tension elements is required, the drive of which is controlled by signals from light barriers. However, a deflection without an interruption in the travel of the pallet is preferred. A solution to this effect is shown, for example, in DE 10 2009 056 545 A1, in which a design with a planetary gear transmission is described. However, such structures are relatively complex.

Therefore, the task of the present invention to provide a secure and cost-effective solution for the deflection of a pallet for its transfer from the upper run to the lower run and vice versa.

SUMMARY OF THE INVENTION

This task is achieved by the invention described more fully below.

The advantages of the invention can be seen in particular in the fact that at least one first form closure element or frictional closure element is fixed to the underside of the pallet, which, upon driving into the respective reversal section, comes into a form-locking or frictional-locking engagement with at least one second form closure element or frictional closure element arranged there, which rotates in the at least one reversal section and carries the pallet by means of a form closure or frictional closure. This form closure or frictional closure becomes disengaged once again upon driving out from the reversal section. As a result of the fixing on the pallet, the first form closure element or frictional closure element moves together with the pallet into the at least one reversal section; that is, it does not rotate around itself. According to the invention, the first and/or the second form closure element or frictional closure element is elastically yielding. For this purpose, the first and/or the second form closure element or frictional closure element features at least one elastic buffer component. If the two form closure elements or frictional closure elements hit each other, the first and/or the second form closure element or frictional closure element yields. As a result of the elastic yielding, at least one of the two form closure elements or frictional closure elements is pushed away from the other and slightly deviates, in order subsequently to be mounted closely to the other form closure element or frictional closure element—under a counter-pressure that is generated, for example, by forcibly guided rollers of the pallet. This allows a strong form closure or frictional closure between the two form closure elements or frictional closure elements. Depending on the geometrical arrangement of the form closure elements or frictional closure elements, at the beginning (that is, upon the initial interlocking of the two form closure elements or frictional closure elements), a relative movement of such elements relative to each other in the circulating direction of the pallet is caused by the elastic yielding, such that, in particular, the first form closure element or frictional closure element, and thus also the pallet, can slide into its final position, in order to achieve the desired form closure or frictional closure. Thus, if a collision between the front edge of the first form closure element or frictional closure element with the second form closure element or frictional closure element arises, a forced clamping by means of the elastic component, and thus mechanical damage to the parts involved, is avoided. The synchronization of the pallet movement with the tension elements is no longer necessary.

In addition, the invention offers the advantage that a pallet can be lifted off the upper run, since no latch or the like (see above) directed towards the tension element (for example, the transport chain) must be present in order to securely hold the pallet in the reversal section.

More preferably, slotted links are provided in the at least one reversal section, in which slotted links guide elements, in particular rollers, arranged on the pallet are forcibly guided. In the case of rollers, they run on the inner side of the slotted link in such a manner that the pallet, and thus the first form closure element or frictional closure element, presses against the second form closure element or frictional closure element rotating around the fixed axis of rotation, by which the specified form closure or frictional closure is realized.

The first form closure element or frictional closure element preferably rotates synchronously with the deflecting elements, and is preferably also driven by the specified engine. It is thereby possible to arrange the first form closure element or frictional closure element on the same axis on which the deflecting elements are also mounted. This design is simple to implement and is cost-effective. In addition, it brings about the fact that the second form closure element or frictional closure element may guide the pallet into the reversal section, in conjunction with the rails that apply the opposing force, in which the rollers of the pallet run. Other transport elements, for example the gear wheels that engage in transport chains as described above and provide for the propulsion in the upper run and lower run, can also further engage with the tension elements, in particular transport chains, but preferably do not participate in the transport of the pallet into the reversal section.

More preferably, the second form closure element or frictional closure element is formed in the shape of a disk or a wheel, while the first form closure element or frictional closure element extends over an angular range of more than 20°, preferably of more than 35°, and more preferably of more than 50°, for example, of more than 60° and, for example, over an angular range of approximately 70°, and the two form closure elements or frictional closure elements are in form-locking or frictional-locking engagement in the at least one reversal section in this angular range. This large angular coverage is made possible by the at least one elastic buffer component, which yields when the two form closure elements or frictional closure elements encounter each other, and thus allows a large contact surface to be realized between these, which is consistently enlarged after exceeding the vertex on the side of the first form closure element or frictional closure element upon the further driving of the pallet into the respective reversal section.

The first form closure element or frictional closure element preferably features, with the second form closure element or frictional closure element, a larger contact length in the circulating direction than in the transverse direction thereof. In other words, with this embodiment, the effective contact length (when viewed in the circumferential direction) is greater than the contact width. This results in a secure, form-locking or frictional-locking guidance of the pallet over a long distance in the reversal section.

According to a particularly preferred arrangement, the first form closure element or frictional closure element features a concave envelope curve that faces towards the second form closure element or frictional closure element and extends in the circulating direction of the pallet. Likewise preferably, the second form closure element or frictional closure element features a convex envelope curve that is preferably formed in a manner corresponding to the concave envelope curve of the first form closure element or frictional closure element. The concave envelope curve of the first form closure element or frictional closure element preferably extends across the aforementioned angular areas. In the case of a frictional closure, with this arrangement, the two form closure elements or frictional closure elements come into frictional-locking engagement in the reversal sections at such envelope curves. The frictional closure can take place either across the entire envelope curve or only—in the case of a non-uniform arrangement of the frictional surfaces—in certain areas that coincide with the envelope curve, while other areas are located outside the envelope curve and do not come into frictional closure.

A concave progression of the first form closure element or frictional closure element and a convex progression of the second form closure element or frictional closure element enable the pallet to be easily removed from the upper run.

The first form closure element or frictional closure element preferably comprises at least one toothed segment with three or more gear teeth, for example five or seven or nine or even more gear teeth (for example, ten gear teeth), which are mounted in the at least one reversal section, preferably with form closure, at the second form closure element or frictional closure element. For this purpose, the second form closure element or frictional closure element is beneficially formed as a gear wheel. In this case, the aforementioned concave envelope curve is defined by the peaks of the gear teeth of the first form closure element or frictional closure element. Since synchronization of the first and second form closure element and frictional closure elements can be dispensed with, various scenarios of the interlocking of the gear teeth of the first with the gear teeth of the second form closure element or frictional closure element are possible. For example, the front tooth of the first form closure element or frictional closure element can collide with the gear wheel (that is, the second form closure element or frictional closure element) and, for example, if the elastic component is formed at the first form closure element or frictional closure element, brings about the fact that the elastic component gives way upwards upon traveling from the upper run to the lower run and the pallet then slides in the circumferential direction forwards or backwards, until the gear teeth of the first and second form closure element or frictional closure element interlock with one another and the final form closure is established. However, such form closure can also arise at the very beginning upon an exact driving in of the pallet into the reversal section, whereas more and more pairs of teeth also slide into one another during the further driving of the pallet. With progressing travel and thus a rotational movement of the pallet, the form closure is thereby formed with the following gear teeth of the two form closure elements or frictional closure elements, until all the gear teeth of the first form closure element or frictional closure element are in engagement with the second form closure element or frictional closure element.

According to one alternative, the first form closure element or frictional closure element comprises an essentially uniformly concave frictional closure surface; that is, it does not have a toothing, but has a concave surface with a constant radius. Thus, the aforementioned concave envelope curve coincides with this concave frictional closure surface. This is then mounted in the reversal section with frictional closure at the second form closure element or frictional closure element, which preferably features a uniformly convex frictional closure surface corresponding to the concave frictional closure surface of the first form closure element or frictional closure element. Thus, the concave and the convex envelope curves preferably extend concentrically around an axis, around which the second form closure element or frictional closure element rotates. As a result, a full-surface frictional closure between the two form closure elements or frictional closure elements is possible, which is also facilitated by the yielding of the elastic component. In this case, the common frictional closure surface increases during the continuous forward movement of the pallet into the reversal section, until it reaches its maximum. The counter-pressure that presses the pallet against the second form closure element or frictional closure element is preferably effected by the rollers of the pallet, which in turn are forcibly guided into the reversal section.

According to an alternative, in the case of the formation of a frictional closure, the first form closure or frictional closure element can also be formed in a wavy or tooth-shaped manner, as a result of which, even in the case of a pure frictional closure, a continuous surface contact does arise between the two form closure elements or frictional closure elements. According to an alternative, the first form closure element or frictional closure element features a uniformly concave frictional closure surface, which is mounted with frictional closure at the teeth peaks of a gear wheel as a second form closure element or frictional closure element.

According to a further alternative, the first form or frictional element features a partial toothing; thus, it comprises, in particular, two or more gear teeth and a particularly concave surface. Correspondingly, the second form closure element or frictional closure element can feature corresponding counter-surfaces. Overall, a transmission of force based on a form closure is achieved.

According to a particularly preferred embodiment, the second form closure element or frictional closure element comprises a gear wheel, on which an endless chain is tensioned. With this gear wheel and the endless chain, the first form closure element or frictional closure element then comes into a form-locking or frictional-locking contact. The specified chain tensioned on the gear wheel, which is preferably similar or even identical to a conventional bicycle chain, constitutes a highly cost-effective wear element and can take up large parts of the force absorption and thus the abrasion.

Upon the specified form closure, gear teeth of the first form closure element or frictional closure element, preferably three or more gear teeth, which preferably form a concave envelope curve and extend across the aforementioned angular ranges, engage with form closure in the intermediate spaces formed by the links of the tensioned chain. Thereby Thus, it is particularly preferred that the gear teeth of the first and second form closure element or frictional closure element do not come into contact with each other. In other words, the gear teeth of the first form closure element or frictional closure element exclusively abut the chain links of the tensioned chain. For this purpose, the gear teeth of the first and second form closure elements or frictional closure elements are advantageously formed to be flat. In this case, the abrasion load essentially lies at the chain links, which—as stated above—can be replaced in the most simple manner.

Upon a specified frictional closure, the frictional surfaces of the first form closure element or frictional closure element are located on the chain links that protrude beyond the gear teeth of the gear wheel. In this case as well, only the chain has to be replaced if the wear is excessive.

Of course, two or more gear wheels (for example) arranged next to each other can also be provided, which are arranged transversely to the direction of transport and engage with ones—correspondingly wide—or more first form closure elements.

The second form closure element or frictional closure element more preferably comprises a gear wheel, which features at least one elastic, preferably circumferentially continuous, toothed outer circumferential section as an elastic buffer component. If the first form closure element or frictional closure element comes into contact with this elastic buffer component, the latter yields and, at the same time, exerts a pressure against the first form closure element or frictional closure element, which supports the form closure or frictional closure. If, in the case of a gear formed in this manner, a chain is tensioned (see above), upon the impingement of the first form closure element or frictional closure element, such chain is pressed into the elastic buffer component. If the first form closure element or frictional closure element features a concavely extending toothed segment (see above), the gear teeth of this toothed segment do not preferably come into contact with the gear teeth of the gear wheel, either upon the initial interlocking or upon the completely established form closure.

According to one advantageous embodiment, the second form closure element or frictional closure element comprises a gear wheel, which comprises a rigid disk, preferably made of metal, on the peripheral edge of which a toothed rim made of an elastic material, preferably a polyester-urethane rubber, is applied. A corresponding rubber is known under the name Vulkollan®. This design has the advantage that the predominant part of the second form closure element or frictional closure element can be made of steel, and only the outer circumference of the rubber or, in general, the elastic material must be formed in a toothed shape. A replacement of such toothed ring, which for example has a radial extension of approximately 10 mm up to its teeth peaks, according to its wear, is readily possible. Thus, the disk can be, for example, formed as a smooth peripheral edge or a rotating fastening groove or in a toothed shape, whereas, with all such embodiments, the elastic material is applied circumferentially. If a chain is tensioned on the toothed rim and the first form closure element or frictional closure element features at least one toothed segment as described above, the gear teeth of the first and second form closure element or frictional closure element preferably do not touch each other.

In general, it is preferred that the material of the at least one elastic buffer element is an elastic plastic, for example based on rubber or a material with comparable elastic properties.

Preferably, the second form closure element or frictional closure element is arranged between the deflecting elements in a reversal section, advantageously centrally between such deflecting elements. At such place, it is easily accessible, since there is a relatively large amount of free space between the deflecting elements. Moreover, the central arrangement prevents the pallet from being tilted, but is deflected uniformly in the reversal section.

If the at least one elastic buffer element is provided on the first form closure element or frictional closure element, according to one advantageous embodiment, the buffer element can be arranged between the underside of the pallet and a rigid component of the second form closure element or frictional closure element. With this arrangement, the rigid component comes into contact with the second form closure element or frictional closure element in the at least one reversal section and, based on the buffering by the at least one elastic buffer element, yields upon this encounter.

According to one alternative, the at least one elastic buffer element is arranged in such a manner it comes into contact with the second form closure element or frictional closure element when the pallet enters into a reversal section, and remains in contact during the reversal of the pallet. Accordingly, with this embodiment, there is a direct contact between the at least one elastic buffer element of the first form closure element or frictional closure element and the second form closure element or frictional closure element.

With an additional embodiment, at least two elastic buffer elements are provided on the underside of the pallet, whereas a first elastic buffer element is provided on the front side of the pallet (viewed in the circulating direction) and a second elastic buffer element is provided on the rear side of the pallet (viewed in the circulating direction). As a result, a type of tilting movement of the first form closure element or frictional closure element can arise, if it runs up against the second form closure element or frictional closure element, possibly being pushed upwards, and during the further advance, the pallet and, if applicable, the form closure that first takes place (for example, through the positive-locking sliding into each other of gear teeth of both form closure elements or frictional closure elements) rocks back. Thereby, an excellent adaptation of the two form closure elements or frictional closure elements relative to each other in the at least one reversal section can be realized.

With all of the embodiments described, for the application of a counter-pressure for the realization of the form closure or frictional closure, it is advantageous if a slotted link, which is preferably semicircular, is provided on both sides on the reversal sections, along which the rollers of the pallet run. This ensures a simple and efficient guidance of the pallet rollers or pallet wheels in the reversal sections, which ensures the counter-pressure of the pallet against the second form closure element or frictional closure element. The actual carrying of the pallet is realized by the driven second form closure element or frictional closure element, on the basis of the form closure or frictional closure between the two form closure elements or frictional closure elements.

The tension elements are preferably formed as drive chains and the deflecting elements are preferably formed as sprockets.

Additional objects and advantages of the invention will be set forth in part in the following description, or may be obvious from the description, or may be learned through practice of the invention.

BRIEF DESCRIPTION OF THE DRAWINGS

In the following, the invention is described on the basis of figures. The same reference signs stand for components that are the same or have identical effect. The following is shown:

FIG. 2 a perspective view of a reversal section with a transparently shown pallet;

FIG. 3 a side sectional view through a reversal section with a pallet and a first form closure element or frictional closure element, according to a first embodiment (section along A-A in FIG. 2);

FIG. 4 a perspective bottom view of the pallet of FIG. 3;

FIG. 5 a side sectional view of the pallet of FIGS. 3 and 4 (section along B-B in FIG. 4).

FIG. 6 a side sectional view through a reversal section with a pallet and a first form closure element or frictional closure element according to a second embodiment;

FIG. 7 a perspective bottom view of the pallet of FIG. 6;

FIG. 8 a side sectional view of the pallet of FIGS. 5 and 6;

FIG. 9 a side sectional view through a reversal section with a pallet and a first form closure element or frictional closure element according to a third embodiment;

FIG. 10 a perspective bottom view of the pallet of FIG. 9;

FIG. 11 a side sectional view of the pallet of FIGS. 9 and 10;

DETAILED DESCRIPTION

Figure 1:
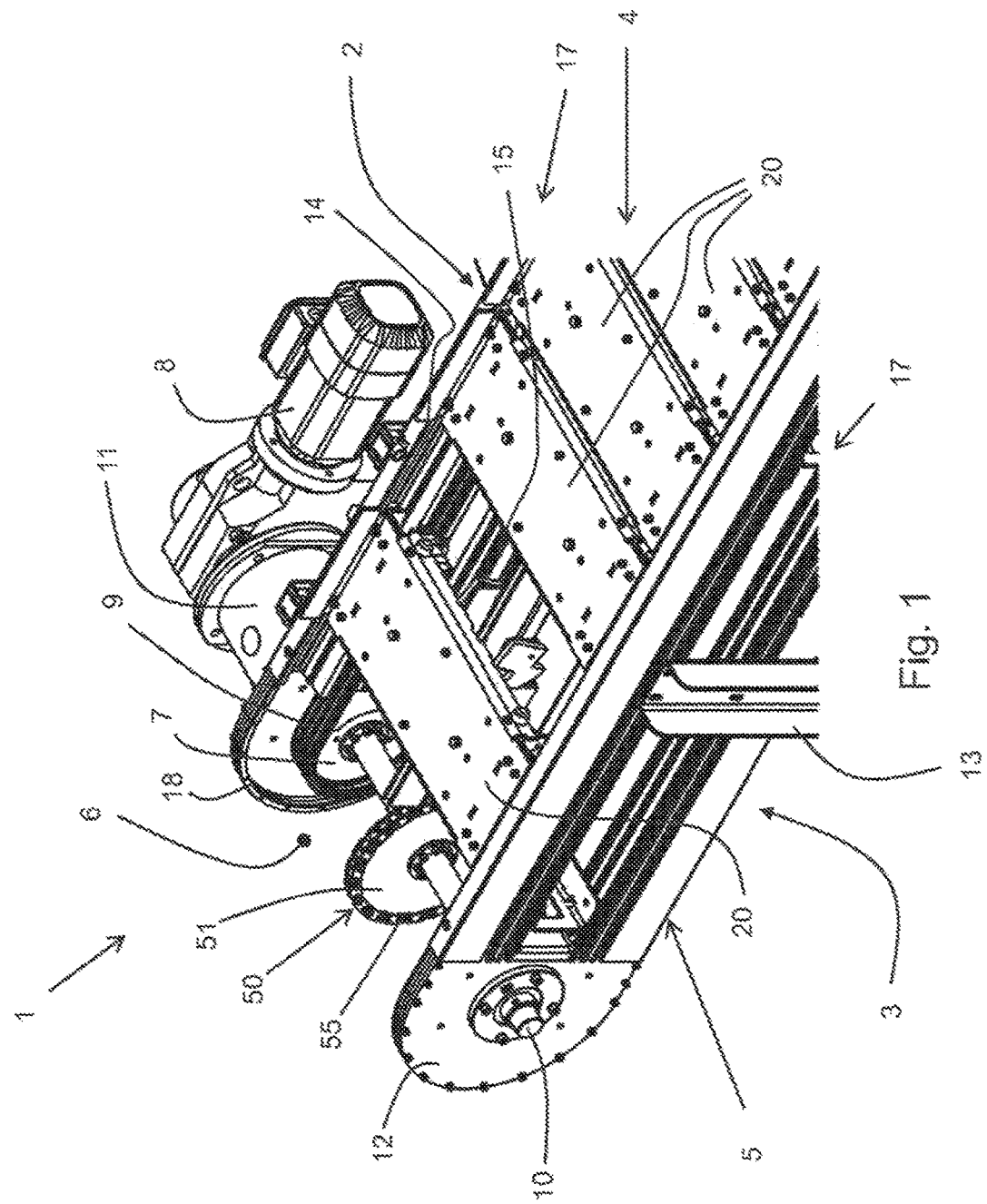
FIG. 1 a perspective partial view of a continuous conveyor with a reversal section.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In a perspective view from above, FIG. 1 shows a continuous conveyor 1 with an upper run 2 and a lower run 3, which together form an upper conveyor track 4 and a lower conveyor track 5 for successively running pallets 20. Each of the upper conveyor track and the lower conveyor track defines a first end at the front surfaces of the runs 2, 3 and disposed longitudinally spaced apart from a second end at the rear surfaces of the runs 2, 3. The upper run 2 and the lower run 3 are connected at their two front surfaces through essentially semicircular reversal sections 6. Though the opposite end of the conveyor 1 is not depicted in FIG. 1, the upper run 2 and the lower run 3 are similarly connected at their two rear surfaces through essentially the same semicircular reversal sections 6. Two running rails 14 and 15, respectively, arranged parallel to one another run in the upper run 2 and lower run 3. In each case, one running rail 14 of the upper run 2 extends above one running rail 15 of the lower run 3, whereas such a pair of running rails 14, 15 is connected by means of struts of a frame 13. In each case, a running rail 14 of the upper run 2 is connected to a running rail 15 of the lower run 3 through a slotted link 18 arranged in the reversal sections 6. Thus, the continuous conveyor 1 features two side sections 17 spaced apart in the transverse direction that is perpendicular to the longitudinal direction, and in each of the two side sections 17 an endless circulation of the pallets 20 is realized.

In the reversal sections 6, deflecting elements 7 in the form of sprockets, which are attached to a common shaft 10, which defines an axis of rotation 16, are also arranged in each side section 17. The shaft 10 is driven by an engine 8 and an interposed transmission 11. Thus, endless tension elements 9, in the form of three-tier endless chains in the present case, run in each side section 17 and carry pallets 20, which endlessly circulate in the continuous conveyor 1. As can be seen in FIG. 4, the pallets 20 feature gear wheels 25, which are mounted on side flanges 24 in the area of the two transverse sides of each pallet 20. Each of the gear wheels 25 is coupled with a hysteresis clutch 26, which is provided on the other side of each side flange 24. Such hysteresis clutches are described in more detail in WO 2004/000698, more specifically A1. If no extraordinary force load is exerted on the gear wheels 25, the gear wheels do not rotate in the tension elements 9, but provide for the propulsion of the pallet 20. If an obstacle arises, for example a stationary pallet 20, the gear wheels 25 begin to rotate, such that the pallet 20 does not move any further. Of course, instead of hysteresis clutches 26, other conventional clutches, for example friction clutches, can also be used.

For a smooth running of the pallets 20 into the running rails 14, 15 along with the slotted link 18, they feature a roller 23 (see, for example, FIG. 4) on their underside 22 at four corner areas.

The invention addresses the deflection of the pallets 20 in the reversal sections 6 by means of a form closure or frictional closure between two respective form closure elements or frictional closure elements, whereas a first such element is provided on the underside 22 of the pallets 20 and a second such element is provided in at least one, preferably in both reversal sections 6.

FIGS. 2-5 show a first embodiment of a first form closure element or a frictional closure element 30. This is provided in the transverse center on the underside 22 of the pallet 20 and comprises a rigid component 31, which is formed to be elongated and extends in the circulating direction UR (see FIG. 3) of the pallet 20. The rigid component 31 features a toothed segment 40 with nine gear teeth 41, which form a concave envelope curve 39 (see FIG. 8) with a constant radius. Instead of nine gear teeth, toothed segments 40 with a different number of gear teeth 41, for example toothed segments 40 with three, six, eight or ten gear teeth 41, can also be used. In the present case, the nine gear teeth 41 extend across an angular range of approximately 70°. The connection to the underside 22 of the pallet 20 is effected by means of two cylindrical elastic buffer components 36, 37, whereas the buffer component 36 is arranged on the front side of the pallet 20 pointed towards the circulating direction UR, and the buffer component 37 is arranged on the rear side of the pallet 20 pointed away from the circulating direction UR. The two buffer components 36, 37, which are fastened to the support or base plate 21 with fastening means 33, such as screws, are arranged in recesses 32 of the rigid component 31 directed towards the underside 22 of the pallet 20, whereas the buffer components 36, 37 are fastened to the rigid component 31 by means of threaded pins (not shown). The fastening of the first form closure element or frictional closure element 30 to the pallet 20 is formed such that there is a gap 38 between the rigid component 31 and the underside 22 of the pallet 20, such that, when the pressure is in the direction of the underside 22 of the pallet 20, due to the elasticity of the buffer components 36, 37, the rigid component 31 can give way upwards.

The buffer components 36, 37 consist, for example, of a rubber, in the present case a polyester-urethane rubber. Such a rubber is marketed, for example, under the name Vulkollan®. It is essential that the modulus of elasticity of the buffer components 36, 37 is significantly less than that of the rigid body 31.

FIGS. 2 and 3 show how the first form closure element or frictional closure element 30 is in form closure with a second form closure element or frictional closure element 50 in a reversal section 6. According to this first embodiment, the second form closure element and frictional closure element 50 comprises a gear wheel 51, which is arranged on the shaft 10 centrally along the transverse direction between the two deflecting elements 7 and is driven synchronously with them. A chain 55, which preferably has little or no backlash, is tensioned on the gear wheel 51. Such a chain 55 may be, for example, a conventional bicycle chain. The upper sides of the chain links of the chain 55 form a convex envelope curve 59.

Upon driving in a pallet 20—for example, from the upper run 2—into a reversal section 6, the front tooth 41 of the toothed segment 40 of the first form closure element and frictional closure element 30 can either arrive directly in an intermediate space between two chain links or collide with a chain link of the chain 55. The force that is thereby generated on the rigid component 31 is intercepted, in particular, by the buffer component 36, and thus damage to the components involved is avoided. Upon such a collision, the pallet 20 then slides forwards or backwards by a short distance, until the toothed segment 40 comes into a form closure with the gear wheel 51. The gear teeth 41 of the toothed segment 40 preferably do not touch the gear teeth of the gear wheel 51 during the entire travel of the pallet 20 in the reversal section 6. Thus, the form closure is established between the gear teeth 41 and the chain 55. In all other respects, this preferably also applies to the embodiments of the embodiments of FIGS. 6-8 and 9-11 presented further below. The gear teeth of the first and second form closure element or frictional closure element are preferably flattened for this purpose.

In the present case, the counter-pressure for pressing the first form closure element or frictional closure element 30 against the second form closure element or frictional closure element 50 and holding it in a pressed manner is exerted by the slotted link 18, which constitutes a forced guidance for the rollers 23 of the pallet 20. As a result, the pallet 20 is held in such a path that the aforementioned form closure is adjusted (as with the frictional closure described below).

With the form closure shown (as also with the second and third embodiments), the contact length in the circulating direction UR is greater than that in the transverse direction QR (see FIG. 4). Thus, the effective contact length in the circumferential direction UR is greater than the contact width in the transverse direction QR.

Even if a form closure of the front tooth 41 with the gear wheel 50 and the chain 55 is formed when the pallet 20 is inserted into the reversal section 6 (thus, without a collision with chain links of the chain 55), the rigid component 31 is deflected upwards, until the first tooth 41 has crossed the vertex. When the pallet is further driven, the form closure then comprises more and more interlocking teeth. The situation shown in FIG. 2 and FIG. 3 then arises, whereas, for the sake of clarity, the ground or support plate 21 of the pallet 20 is shown transparently in FIG. 2.

It should also be noted that FIG. 2 shows that, on the side of the reversal section 6 turned away from the engine 8, a cover 12 is attached in front of the deflecting elements 7. In addition, it can be seen from FIG. 4 (for example) that two stub-shaped stop pins 29 are arranged on the underside 22 of the pallet 20 at either side of the first form closure element or frictional closure element 30, which, upon encountering against a stopper (not shown) driving out of the upper run 2, stops the pallet 20, whereas, at that point, the two gear wheels 25 begin to rotate when tension elements 9 continue to run.

FIGS. 6-8 show a second embodiment of a first form closure element or frictional closure element 130, while the second form closure element or frictional closure element 50 is identical to that of the first embodiment. The sections in the sectional views of FIGS. 6 and 8 match those of the first embodiment. In this case, the first form closure element or frictional closure element 130 also features a rigid component 131, which as with the first embodiment is connected to the underside 22 of the pallet 20 through a front elastic buffer component 36. The rear mounting of the rigid component 131 is different in the second embodiment. In the present case, a double-walled bearing block 34 is provided, on which the rigid component 131 is hinged in a pivoting manner around a horizontal axis of rotation 35. Around this axis of rotation, the rigid component 131 can be deflected at the underside 22 of the pallet, if the front tooth 41 of the toothed segment 40 is subjected to an obstacle, that is, the gear 51 with the tensioned chain 55. The mechanism for producing the form closure between the two form closure elements or frictional closure elements 130, 50 is otherwise the same as with the first embodiment.

FIGS. 9-11 show a third embodiment of a first and second form closure element or frictional closure element 230, 250. With this embodiment, the first form closure element or frictional closure element 230 does not have elastic buffer components; rather; it solely comprises a rigid component 231, which is fastened (for example, welded) to the underside 22 of the pallet 20. The rigid component 231 features a toothed segment 40 that extends in the circulating direction UR and is directed away from the underside 22 of the pallet 20, and here also features nine gear teeth 41, the teeth peaks of which define an envelope curve 39 (see FIG. 11). The angular range a swept by the toothed segment 40 likewise amounts to approximately 65°.

According to the third embodiment, the second form closure element or frictional closure element 250 in the present case is not a gear wheel made of a solid material; rather, it features an inner rigid body 252 in the form of a disk with a smooth edge or a toothed rim, preferably made of steel or aluminum. An elastic buffer component 58 in the form of a completely circumferential toothed rim, in particular consisting of a polyester-urethane rubber, is applied to the peripheral edge of the rigid body 252. The rigid body 252 along with the buffer component 58 in the form of a toothed rim together form a gear wheel 251. In turn, a chain 55 is tensioned on the buffer component 58 in the form of a toothed rim.

Upon driving the pallet 20 into a reversal section 6, a tooth of the tooth-shaped buffer component 58 is pressed in by the front tooth 41 of the rigid component 231; at the same time, an opposing force from the buffer component 58 is exerted on the pallet 20. Due to the elastic yielding of the buffer component 58 and through the guidance of the pallet 20 in the slotted sections 18 of the respective reversal section 6, the pallet 20 is securely guided by means of the form closure of the two form closure elements or frictional closure elements 230, 250 through the reversal section 6.

Figure 13:
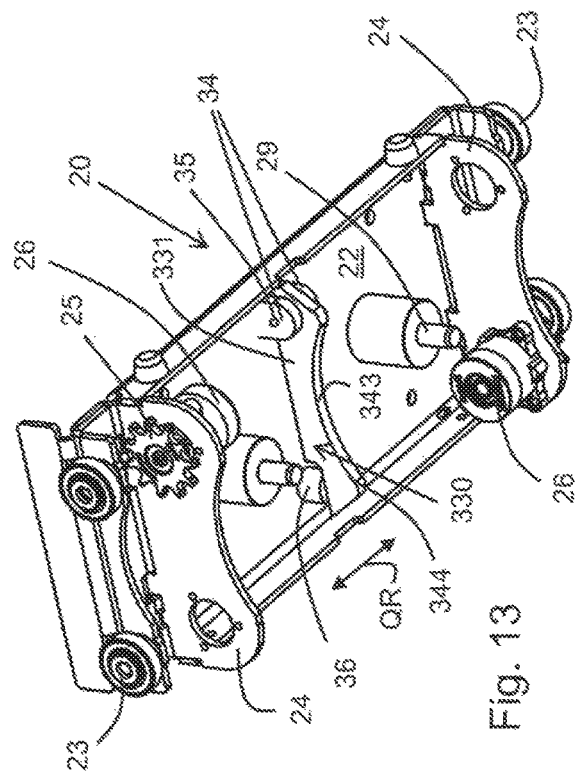
FIG. 13 a perspective bottom view of the pallet of FIG. 12.
Figure 14:
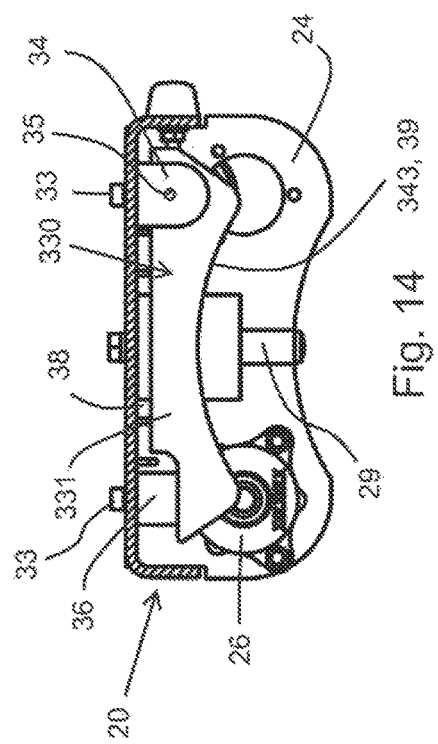
FIG. 14 a side sectional view of the pallet of FIGS. 12 and 13.
Figure 12:
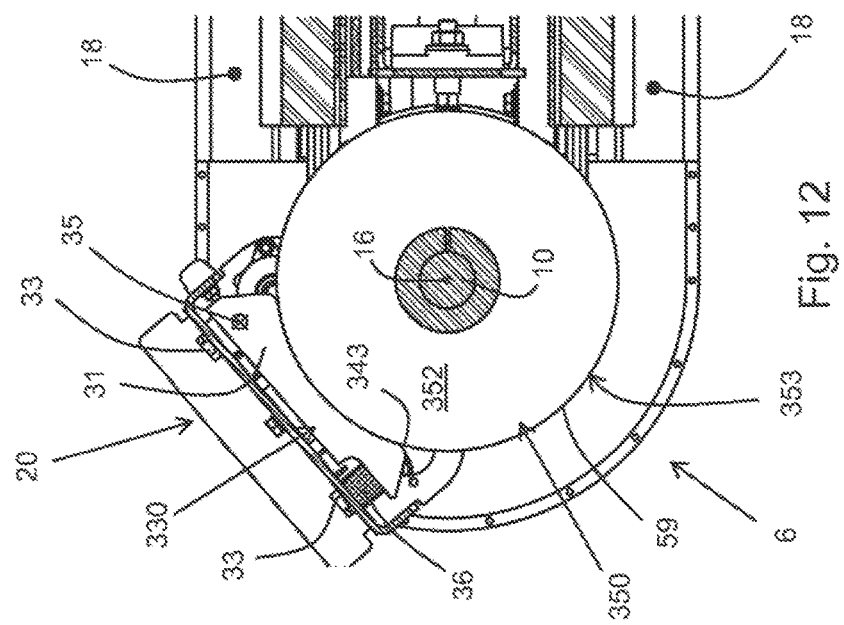
FIG. 12 a side sectional view through a reversal section with a pallet and a first form closure element or frictional closure element according to a fourth embodiment.

FIGS. 12-14 show a fourth embodiment in which, in contrast to the preceding embodiments, a frictional closure is established between the first and second form closure elements or frictional closure elements 330, 350. For this purpose, the first form closure element or frictional closure element 330 is formed to be comparable to the first form closure element or frictional closure element 130 (elastic buffer component 36, deflection around the axis of rotation 35), with the difference that, instead of a toothed segment 40 on the rigid component 331, a uniform concave frictional surface 343 is provided, which in turns takes the form of an envelope curve 39 in the side view. The angular range a swept by the toothed segment 40 likewise amounts to approximately 65°. The second form closure element or frictional closure element 350 features a rigid body 352 with a convex frictional closure surface 353 that matches the concave frictional closure surface 343.

Upon the running aground of the concave frictional closure surface 343 on the convex frictional closure surface 353, the front edge 344 of the rigid component 331, and thus the buffer component 36, are loaded and pressed in, until a full-surface frictional closure between the two frictional closure surfaces 343, 353 is achieved. In this case as well, the counter-pressure is defined by the slotted links 18 in the reversal sections 6, which guide the rollers 23 of the pallet 20. Through the slotted link 18, an inwardly directed force is exerted on the pallet 20, while the frictional closure presses the pallet 20 outwards, such that, overall, a secure guidance of the pallet 20 in the reversal section 6 arises.

In general, based on the giving way imparted by the at least one elastic buffer component, without the contact between the two form closure elements or frictional closure elements (advantageously caused by the action of the slotted elements 18) being lost, the invention makes it possible for the two form closure elements or frictional closure elements to be mounted on each other in a non-destructive manner.

According to one alternative (not shown), the at least one elastic buffer component is arranged on the underside of the pallet and comes into direct contact with the second form closure element or frictional closure element in the at least one reversal section. For this purpose, for example, the concave frictional closure surface according to the fourth embodiment may feature a rubber layer with a thickness of a few mm. Moreover, it is possible that the toothed segment 40 according to the first to third embodiments is made of a rubber (similar to the buffer component 58 in the form of a toothed rim).

Moreover, according to one embodiment (which is also not shown), a circumferential rubber layer can be provided on the rigid body 351 (FIGS. 12-14) of the second disk-shaped form closure element and frictional closure element 350, which forms a uniform convex frictional closure surface 353. A corresponding concave frictional closure surface is provided on the first form closure element or frictional closure element 330, which, if applicable, does not then feature a buffer element 36.

Rubber is preferably used as the material for the elastic buffer components. However, it is also possible that, in certain embodiments, the elastic buffer components are formed as springs or the like. However, given its simplicity and robustness, the use of rubber is preferred.

The invention has been explained in more detail based on embodiments. However, to the extent possible, characteristics of various embodiments can be combined with each other, in order to obtain new embodiments that are a part of the invention. In addition, the invention comprises variations that lie within the claims.

LIST OF REFERENCE SIGNS

1 Continuous conveyor
2 Upper run
3 Lower run
4 Upper conveyor track
5 Lower conveyor track
6 Reversal section
7 Deflecting element
8 Motor
9 Tension element
10 Shaft
11 Transmission
12 Cover
13 Frame
14 Running rail
15 Running rail
16 Axis of rotation
17 Side section
18 Slotted link
19 Pallet
20 Base plate
21 Underside of the pallet
22 Rollers
23 Side flange 24 Gear wheel
25 Hysteresis clutch
26 Stop pins
27 First form closure element or frictional closure element
28 Rigid component
29 Recess
30 Fastening means
34 Bearing block
35 Axis of rotation
36 Buffer component
37 Buffer component
38 Gap
39 Concave envelope curve
40 Toothed segment
41 Gear teeth
50 Second form closure element or frictional closure element
51 Gear wheel
55 Chain
58 Elastic buffer component (toothed rim)
59 Convex envelope curve
130 First form closure element or frictional closure element
131 Rigid component
230 First form closure element or frictional closure element
231 Rigid component
250 Second form closure element or frictional closure element
251 Gear wheel
252 Rigid body
330 First form closure element or frictional closure element
331 Rigid component
343 Concave frictional closure surface
344 Front edge
350 Second form closure element or frictional closure element
352 Rigid body
353 Convex frictional closure surface

The invention claimed is:

1. Closed continuous conveyor for pallets, comprising:
an upper run that is elongated in the longitudinal direction and is disposed parallel to and spaced apart from a longitudinally elongated lower run, which respectively form an upper conveyor track and a lower conveyor track, each of the upper conveyor track and the lower conveyor track defining a first end disposed longitudinally spaced apart from a second end, a first reversal section connecting the respective first end of the upper conveyor track and the respective first end of the lower conveyor track, a second reversal section connecting the respective second end of the upper conveyor track and the respective second end of the lower conveyor track, each of the first reversal section and the second reversal section including a respective deflecting element, at least one of the deflecting elements being configured to be connected to an engine to be driven by the engine;
a plurality of tension elements that are endlessly moveable in a circulating direction in the upper and lower runs and in the reversal sections, wherein in the reversal sections the tension elements being in driving engagement with the deflecting elements;
at least one pallet, which is carried by at least one of the tension elements; and
at least one first form closure element fixed to the underside of the at least one pallet;
a second form closure element that is arranged in each reversal section and rotates around a fixed axis of rotation, wherein in each reversal section, the at least one first form closure element comes into a form locking engagement with the respective second form closure element that is arranged in the respective reversal section, whereas each of the second form closure elements includes an elastic buffer component, which yields when hit by any of the first form closure elements that are carried by any of the pallets; and
wherein the second form closure element includes a wheel defining a peripheral edge, whereas the at least one elastic buffer component is fixed to the peripheral edge of the wheel and is formed in a toothed shape.

2. Continuous conveyor according to claim 1, wherein the wheel of the second form closure element is formed in the shape of a disk, and wherein in at least one reversal section of each first form closure element is in form-locking engagement with the second form closure element over an angular range of more than 20°.

3. Continuous conveyor according to claim 1, wherein a transverse direction is perpendicular to the circulating direction and perpendicular to the longitudinal direction, wherein in at least one of the reversal sections the second form closure element remains in contact with the first form closure element in the circulating direction over a longer distance than in the transverse direction.

4. Continuous conveyor according to claim 1, wherein the peripheral edge of the wheel of each second form closure element defines a convex envelope curve; wherein when in each of the reversal sections the first form closure element defines a concave envelope curve that faces toward the second form closure element and extends in the circulating direction and concentrically matches the convex envelope curve of the second form closure element.

5. Continuous conveyor according to claim 4, wherein when in each of the reversal sections the first and second form closure elements come into form-locking engagement, the convex envelope curve and the concave envelope curve are spaced apart from one another.

6. Continuous conveyor according to claim 1, wherein the first form closure element includes at least one toothed segment with at least three gear teeth.

7. Continuous conveyor according to claim 1, wherein a transverse direction is perpendicular to the circulating direction and perpendicular to the longitudinal direction, wherein each of the first form closure element and the second form closure element is disposed spaced apart in the transverse direction from the at least one of the deflecting elements that is configured to be connected to an engine to be driven by the engine.

8. Continuous conveyor according to claim 1, wherein a transverse direction is perpendicular to the circulating direction and perpendicular to the longitudinal direction, wherein each second form closure element is arranged along the transverse direction between the deflecting elements of the respective reversal section.

9. Continuous conveyor according to claim 1, wherein a transverse direction is perpendicular to the circulating direction and perpendicular to the longitudinal direction, wherein each second form closure element is arranged along the transverse direction centrally between the deflecting elements of the respective reversal section.

10. Continuous conveyor according to claim 1, wherein the second form closure element comprises a gear wheel and a plurality of chain links forming an endless chain, which is tensioned on the gear wheel.

11. Continuous conveyor according to claim 10, wherein when in each reversal section, the first form closure element contacts the chain links of the endless chain but does not contact the gear teeth of the gear wheel.

12. Continuous conveyor according to claim 1, wherein the wheel of the second form closure element defines a disk-shaped rigid body, and the toothed shape of the at least one elastic buffer component defines a convex envelope curve that faces toward the first form closure element of any pallet that travels through the reversal section of the respective second form closure element.

13. Continuous conveyor according to claim 1, wherein the at least one elastic buffer element consists of an elastic plastic.

14. Continuous conveyor according to claim 1, wherein the second form closure element rotates synchronously with the deflecting elements.

15. Continuous conveyor according to claim 1, wherein the second form closure element is connected so as to be rotatably driven by the engine.

16. Continuous conveyor according to claim 1, wherein each pallet includes guide elements; wherein slotted links are provided in at least one reversal section, in which the guide elements of each pallet are guided in such a manner that a counter-pressure of the first form closure element against the second form closure element arises for generating and maintaining form closure between the first form closure element against the second form closure element.

* * * * *